C. H. Bradley.
Churn.
Nº 77,352.    Patented Apr. 28, 1868.
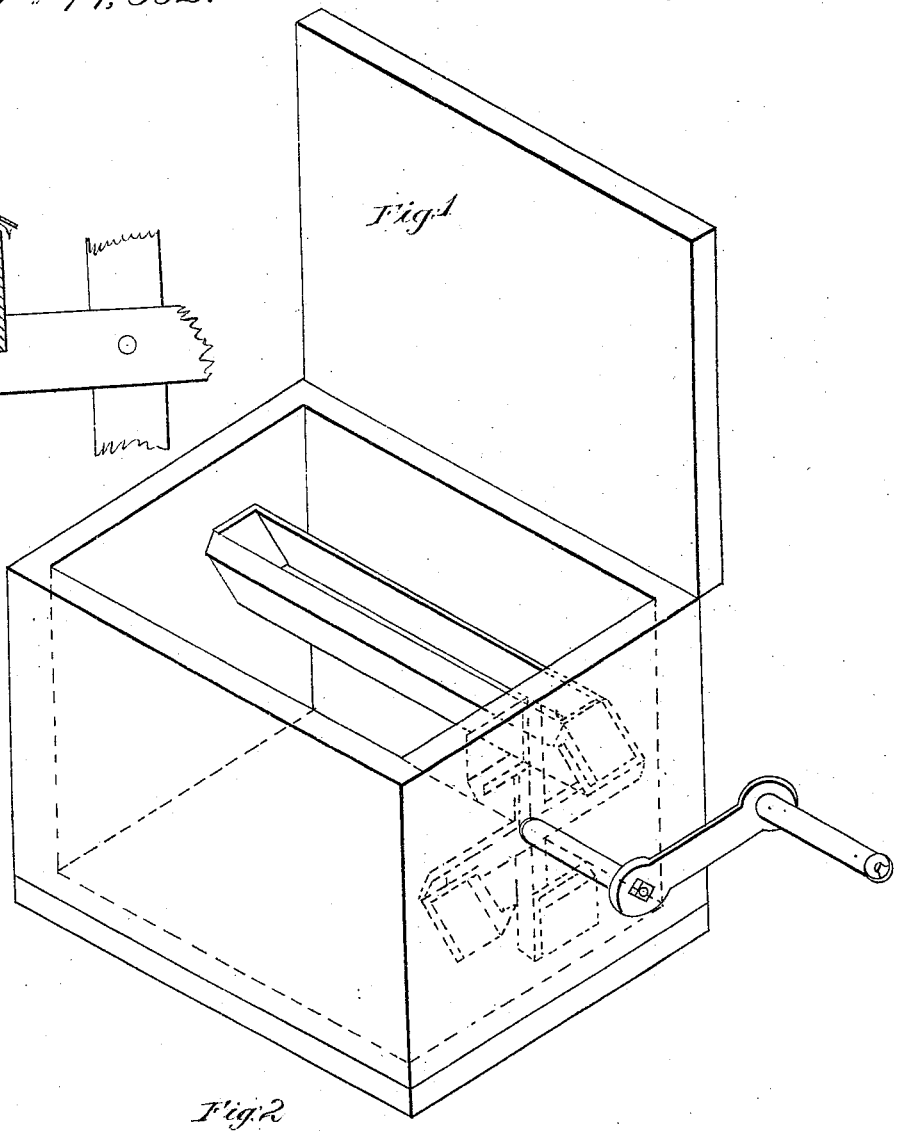
Fig. 3
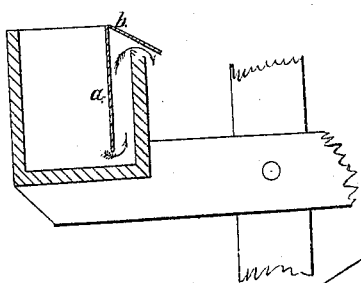
Fig. 1
Fig. 2
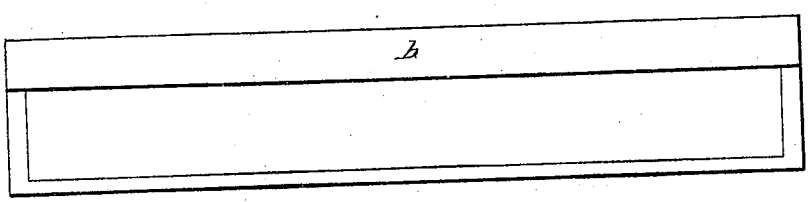
Witnesses:
Wm R Ash
John M Branson
Inventor:
C H Bradley

United States Patent Office.

CALEB H. BRADLEY, OF COATESVILLE, PENNSYLVANIA.

Letters Patent No. 77,352, dated April 28, 1868.

IMPROVEMENT IN CHURNS.

The Schedule referred to in these Letters Patent and making part of the same.

TO ALL WHOM IT MAY CONCERN:

Be it known that I, CALEB H. BRADLEY, of Coatesville, in the county of Chester, and State of Pennsylvania, have invented a new and useful Improvement in Churns; and I hereby declare that the following is a full, clear, and exact description of the same, reference being had to the accompanying drawings, making a part of this specification, in which—

Figure 1 is a perspective view of a churn, with lid raised, showing the arrangement of the revolving buckets or air-chambers (commonly called "dashers") in the usual manner.

Figure 2 is a view of the top or open side of one of the buckets or chambers detached, which may be constructed rectangular, or of any other suitable shape, and are attached to the arms or dashers of any ordinary revolving churn, for the purpose of conveying the atmosphere into and mingling or distributing it with and among the milk or cream in their revolutions, and thereby facilitating or hastening the separation, or, as it is termed, the breaking of the butter.

Figure 3 is an end view of the bucket or chamber, fig. 2.

The interior of these chambers is divided by divisions, as shown by $a$, fig. 3, adjusted therein, near to either or both sides, and extending from the top or mouth of the chamber to near the bottom thereof, thus forming a flue or passage of escape for the atmosphere, when pressed upon by the milk or cream, through which the buckets pass in their revolutions.

From the out edge of the divisions, and tightly connected therewith, are lids or coverings for the air-flues, as shown by $b$, figs. 2 and 3, which coverings project outwards, over and beyond the mouth of the flues, at any desired angle, but leaving the mouth of the flue unobstructed.

These projecting coverings create, in their passage through the milk or cream, a vacuum, which is constantly filled with the air from the buckets or chambers until exhausted.

Having thus described my invention, what I claim as new, and desire to secure by Letters Patent, is—

The construction of flues or passages of escape for the air from the buckets or chambers, with the projecting covering for the mouth of the flues, as and for the purposes herein described and set forth.

C. H. BRADLEY.

Witnesses:
WM. R. ASH,
JOHN M. BRANSON.